Oct. 7, 1969  R. O. COLE  3,470,649
FISHING-LINE CONTROLLER
Filed June 24, 1968  2 Sheets-Sheet 1
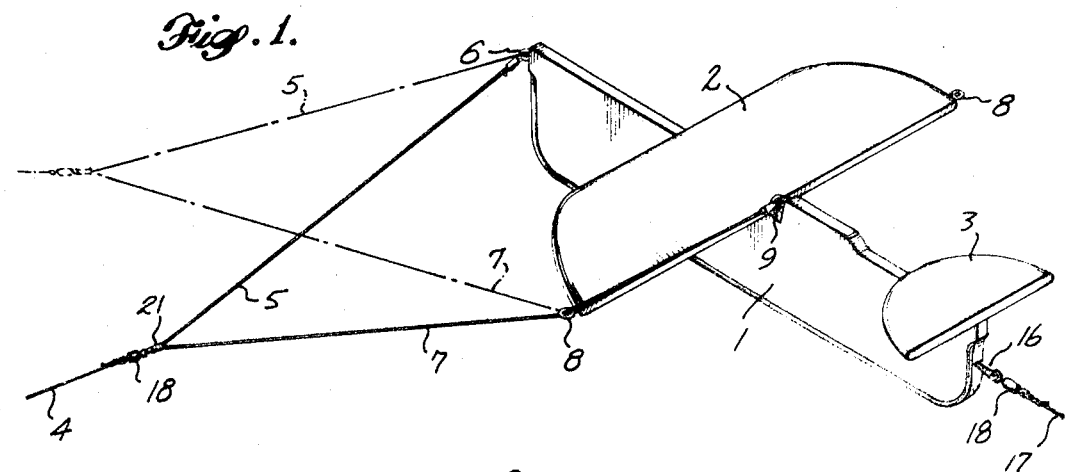
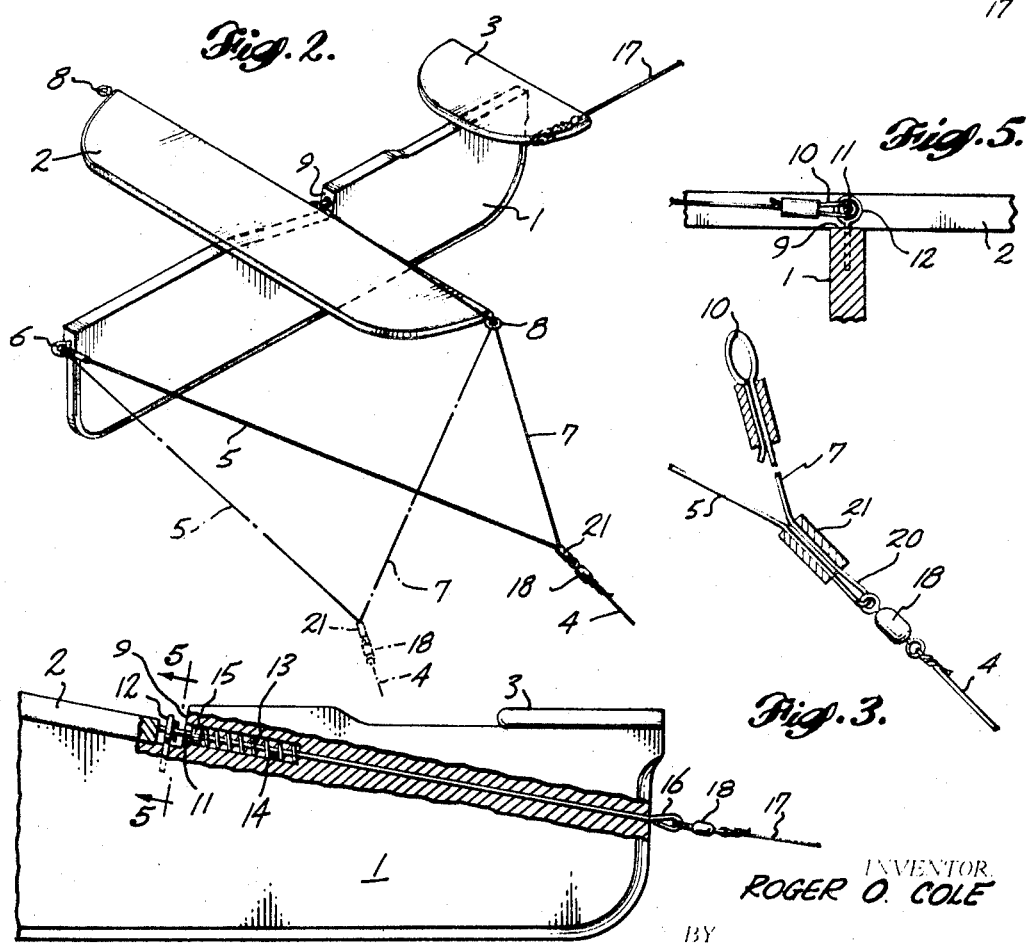
INVENTOR.
ROGER O. COLE
BY
Robert W. Beach
ATTORNEY Oct. 7, 1969  R. O. COLE  3,470,649
FISHING-LINE CONTROLLER
Filed June 24, 1968  2 Sheets-Sheet 2
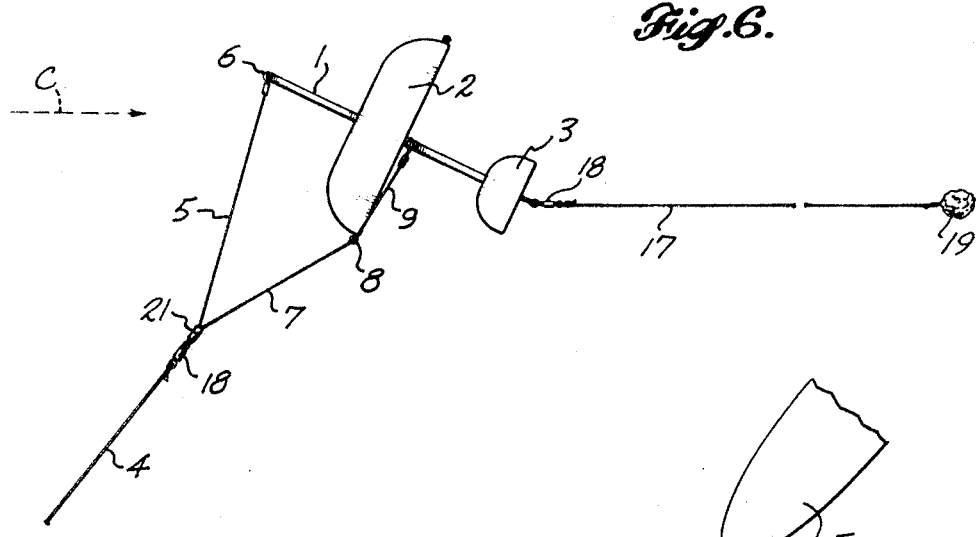
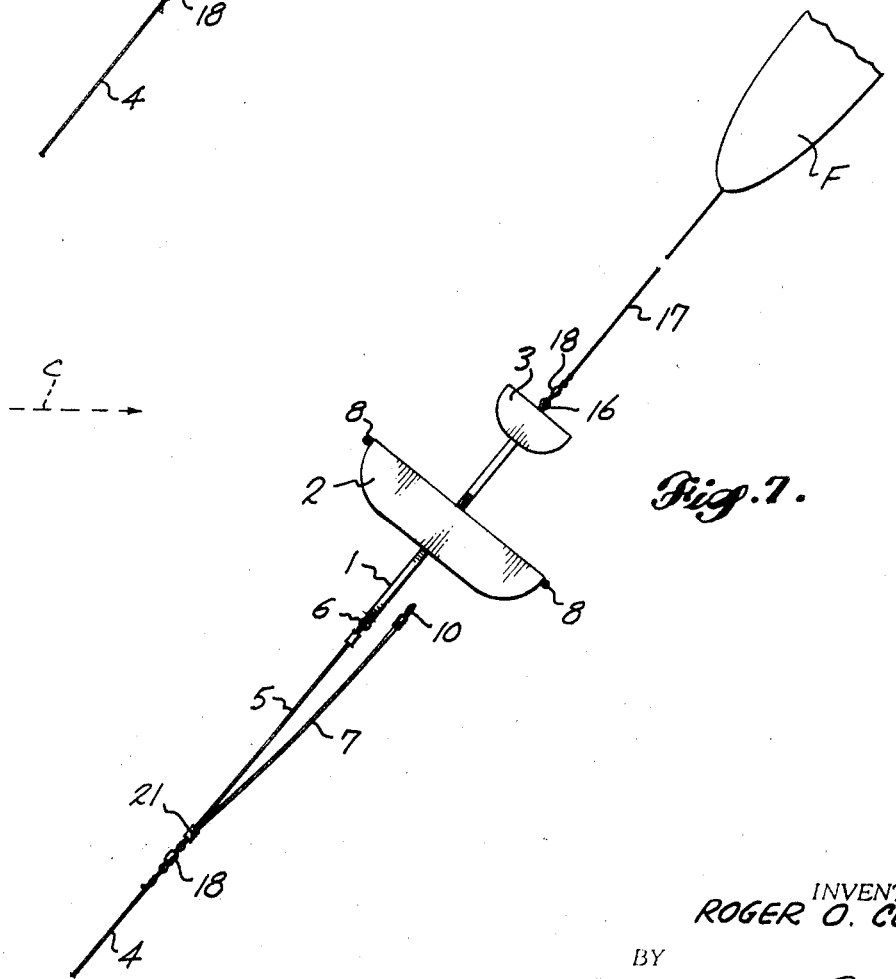
INVENTOR.
ROGER O. COLE
BY
Robert W. Beach
ATTORNEY

… … …

United States Patent Office 3,470,649
Patented Oct. 7, 1969

3,470,649
FISHING-LINE CONTROLLER
Roger O. Cole, Rte. 1, P.O. Box 449,
Granger, Wash. 98932
Filed June 24, 1968, Ser. No. 739,301
Int. Cl. A01k *91/00, 83/00*
U.S. Cl. 43—43.13                              6 Claims

ABSTRACT OF THE DISCLOSURE

A towing fishing line has one bifurcation or branch line attached to the bow of a vertical plate body and its other bifurcation extending through an eye in a tip of a horizontal supporting vane mounted amidships on the plate body. A horizontal stabilizing plane is mounted on the stern of the plate body. The end of the second towing line bifurcation is releasably secured to the plate body by a latch wire extending through a loop in the line end and urged toward securing position by a compression spring. A bait line is connected to the latch wire so that a pull on the bait line will draw the latch wire lengthwise in opposition to the spring force to release the end of the second tow line bifurcation. The stress on the tow line will pull the second bifurcation out of its connection to the supporting vane tip so that instead of serving as a bridle to maintain the plate body transversely to the tow line, the tow line will exert a pulling force only on the bow of the body so that the body will swing into alignment with the tow line after a fish has struck the bait.

---

A principal object of the invention is to provide a controller for a fishing line which can swing the trailing end of a fishing line transversely of the direction of relative movement between the fishing line and water in which the fishing line is immersed. Such capability will enable the end of a fishing line to be swung out into a stream or transversely of the course of a boat by which the fishing line is towed. Associated with such object is the capability of discontinuing such line swinging automatically by a fish striking bait towed by such line so that in landing the fish, the fishing line will extend straight from the fishing pole to the fish.

Another object is to provide a connection between a fishing tow line and a controller which will hold the fishing line and controller securely in one relationship until a fish strikes the bait and which connection will then be released quickly and reliably to enable the relationship between the fishing tow line and the controller to be altered.

An additional object is to provide a connection between the main tow line and trailing bifurcations of it which will enable the relative length of such bifurcation to be adjusted readily yet securely to establish different attitudes of the fishing line controller relative to the towing line.

FIGURE 1 is a top perspective of a fishing-line controller attached to a fishing line viewed from the aft port quarter and FIGURE 2 is a top perspective of the controller viewed from the forward port quarter.

FIGURE 3 is a fragmentary plan of the junction between the main portion of the towing fishing line and its bifurcations, parts being broken away.

FIGURE 4 is a port side elevation of the aft portion of the controller, having parts broken away, and FIGURE 5 is a section through a portion of the controller taken on line 5—5 of FIGURE 4.

FIGURE 6 is a plan of the fishing-line bridle and controller with the controller in line-deflecting relationship to the fishing line, and FIGURE 7 is a similar view with the controller in nondeflecting relationship to the fishing line.

In stream fishing, it is frequently desirable to be able to place the fishing bait generally in midstream. Without the use of some type of fishing-line controller, such location of the line ordinarily is possible only by fishing from a bridge extending across the stream or by the fisherman extending a fishing pole transversely of the direction of flow of the stream if the stream is not very wide or by the fisherman wading out into the stream if the stream is not very deep or by the fisherman fishing from a boat. If, however, there is no bridge and the stream is wide and deep and the fisherman has no boat or the stream is unsuitable for boat navigation, the fisherman must fish from the bank so that normally he must rely only on the length of his fishing pole to locate the bait spaced from the stream bank.

By using the fishing-line controller of the present invention, the bait towed by a fishing line can be moved from a stream bank out into the stream virtually to any extent desired yet, when a fish strikes the bait, the effect of the fishing-line controller to deflect the fishing line will be eliminated so that there will be a straight pull between the fishing pole and the fish while the fish is being reeled in to be landed. A controller capable of functioning in this manner includes an elongated plate body 1 disposed in an upright plane. A supporting vane 2 is secured to such body amidships of it. The length of such supporting vane extends transversely of the length of the body and the chord of the supporting vane is set at an angle of incidence to the body so as to tend to keep the controller substantially on the surface of the water. A stabilizing vane 3 is mounted on the aft portion of the body substantially in a horizontal plane. The length of such stabilizing vane extends transversely of the length of the body. While the supporting vane and the stabilizing vane could be disposed in different elevational relationships to the body, it is preferred that they be mounted on the upper edge of the body as shown in FIGURES 1, 2, and 4.

The towing fishing line has a main body portion 4 which can be connected to a fishing pole and a trailing bifurcated portion, including a branch line 5 which is attached to an eye 6 secured to the bow of the body 1, and a trailing branch line 7 which can be detachably secured to the amidships portion of the body. Each tip of the supporting vane 2 carries an eye 8 through one of which the branch line 7 is threaded when its end is attached to the body. The branch line end is received in a notch 9 in the upper portion of the body located immediately aft of the supporting vane 2. Such branch line end carries an eye or loop 10 through which a latch wire or rod 11 in the notch 9 may extend to secure the end of the branch line 7 to the body.

The latch wire or rod 11 extends lengthwise through a bore in the aft portion of the plate body 1, as shown in FIGURE 4, in which bore the wire or rod is reciprocable lengthwise. The forward end of such rod can bridge the notch 9 in a fore-and-aft direction, as shown in FIGURE 4, and such rod end can extend through an eye 12 located in such notch to limit lateral deflection of the rod or wire out of the notch 9. Such eye also supports the portion of the rod or wire between the body bore through which it extends and eye 12 against the pull of the branch line 7 exerted on the loop 10 which is lodged between such body bore and the eye 12. The rod end 11 will be projected through the eye 12 by the force of a compression spring 13 encircling rod 11 and received in an enlarged cavity 14 in the plate body, one end of which opens into the notch 9. Such spring is engaged between the closed end of the cavity 14 and a collar 15 secured on the rod 11 at a location spaced from its latching end. Such collar is received slidably in the cavity 14.

The bore, in which the wire 11 is slidably received, is inclined downwardly and rearwardly from cavity 14 and opens through the aft end of the body 1, as shown in FIGURE 4. The trailing end of the wire has a loop 16 which is connected to a bait line 17 by a swivel connector 18. Any suitable bait 19 may be used such as a chunk of meat, a herring, or a plug. When a fish strikes such bait, the pull on bait line 17 will be transmitted through the connector 18 and loop 16 to the latch wire 11. Such pull will slide collar 15 rearwardly in cavity 14 against the force of spring 13 until the forward end of the wire has been withdrawn from the eye 12 so as to enable the loop 10 of branch line 7 to slip between the forward end of the wire 11 and the eye to be released.

FIGURES 6 and 7 illustrate two typical rigging conditions of the line controller during use. In order to swing the end of the main towing fishing line 4 across the current of a stream, the two branch lines 5 and 7 of the towing line are connected to the controller by the bow eye 6 and the latch wire 11 amidships, respectively. The relative lengths of the branch lines 5 and 7 are shown to be such that the plate body 1 will be held at an angle of attack relative to the direction of the current C such that the body will tend to plane away from the held end of tow line 4. The angle of incidence at which the supporting vane 2 is set relative to the body will tend to raise the body substantially to the surface of the water, and the stabilizing vane 3 will deter pitching of the body. The longer branch line 5 is with respect to the length of the branch line 7, the greater will be the angle of attack of the plate body 1 to the current direction C and, consequently, the greater will be the force produced by the stream flow on the body tending to swing the controller upstream. As the controller moves upstream, the angle of attack will be reduced automatically until an equilibrium is reached between the upstream component of the pull on line 4 and the downstream force of the current C on the controller.

As shown in FIGURE 3, the main section 4 of the towing line is connected by the swivel connector 18 to the connecting loop 20 at the bifurcation of the towing line which is formed by the sleeve 21. Adjacent portions of the two branch lines 5 and 7 extend through the sleeve 21 and are frictionally held by such sleeve in the desired adjusted relationship. Prior to placing the line in use, the sleeve 21 can be slid away from connector 18 to enlarge loop 20 and one or both of the branch lines can then be slid through the sleeve to alter the relative lengths of the branch lines. The sleeve is then again slid toward connector 18 to reduce the size of the loop as indicated in FIGURE 3. If the branch line 5 is lengthened and the branch line 7 shortened from the relationship shown in broken lines in FIGURES 1 and 2 to the relationship shown in solid lines in those figures, the angle of attack of the controller body relative to the current direction C, when the controller has been maneuvered into the stream flow as shown in FIGURE 6, will be greater and consequently the end of the main tow line section 4 will swing farther upstream. The main consideration, however, is that the lift produced by the stream flow on the plate body will pull the towing line section 4 lengthwise to move the line controller out into the stream in the manner indicated in FIGURE 6. When a fish strikes the bait and pulls the bait line 17 and wire 11 to trip or release loop 10 of branch line 7, however, as described above, the resulting pull on the branch line 7 will draw the loop through the eye 8 on the tip of the supporting vane 2 so that the tow line will be attached to the controller only through the branch line 5 connected to the bow eye 6. Consequently, the body of the controller will become aligned with the towing fishing line 4 and the bait line 7 connected to the fish in the manner illustrated in FIGURE 7. The fish can then be reeled in and landed without interference from the controller.

In order to enable the controller to draw out a fishing line from either bank of a stream into midstream, an eye 8 is provided on each tip of the supporting vane. The trailing branch line 7 will always be inserted through the eye of the supporting vane tip such that when the fishing line 4 is paid out, the bow of the body will be upstream. After a fish has been released from the fishhook, the bridle can be reset for fishing condition by threading loop 10 through the appropriate eye 8 and reconnecting it to the latch wire 11, as illustrated in FIGURES 1, 2, and 6.

I claim:

1. A fishing-line controller comprising a body elongated in a fore and aft direction, an elongated transverse member carried by said body amidships and having its length crossing the length of said body, a bait line extending rearwardly from said body, a fishing-line bridle including a forward branch line secured to the bow of said body and a rearward branch line extending to the midships portion of said body, latch means securing the end of said rearward branch line to said body and releasable by pulling said bait line to disconnect said rearward branch line from said body, and guide means on said transverse member spaced from said body and engaging a portion of said rearward branch line spaced from said latch means and disengageable from said rearward branch line upon disconnection of said rearward branch line from said body by release of said latch means.

2. The fishing-line controller defined in claim 1, in which the transverse member is a vane disposed in a generally horizontal plane.

3. The fishing-line controller defined in claim 1, and a stabilizing vane carried by and crossing the aft portion of the body and disposed generally in a horizontal plane.

4. The fishing-line controller defined in claim 1, in which the rearward branch line has a loop on its end, and the latch means includes a rod connected to the bait line and reciprocable by pulling the bait line for withdrawing the rod from the loop to release the rearward branch line.

5. The fishing-line controller defined in claim 1, in which the bridle includes connecting means connected to the forward branch line and the rearward branch line and adjustable to alter the relative lengths of the branch lines between said connecting means and the connections of the branch lines to the body.

6. The fishing-line controller defined in claim 5, in which the connecting means includes a sleeve engageable with both the forward branch line and the rearward branch line.

References Cited

UNITED STATES PATENTS

| | | | |
|---|---|---|---|
| 2,862,326 | 12/1958 | Minera | 43—43.13 |
| 3,044,208 | 7/1962 | Minera | 43—43.13 |
| 3,134,189 | 5/1964 | Hubbart | 43—42.04 X |
| 3,216,147 | 11/1965 | Minera | 43—43.13 |

WARNER H. CAMP, Primary Examiner